Sept. 6, 1938.   D. G. K. MOSS   2,128,956
GYROSCOPIC NAVIGATIONAL INSTRUMENT
Filed Jan. 16, 1937   4 Sheets-Sheet 3

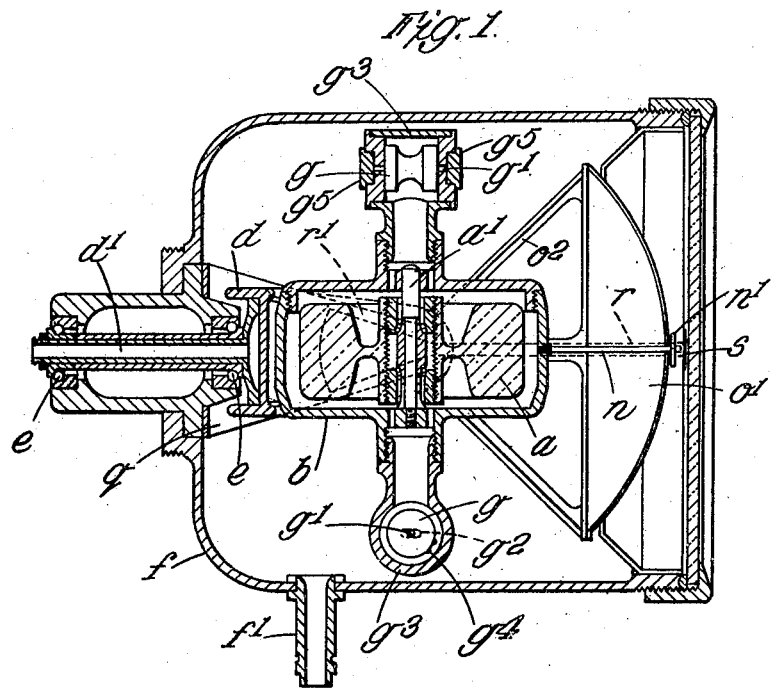

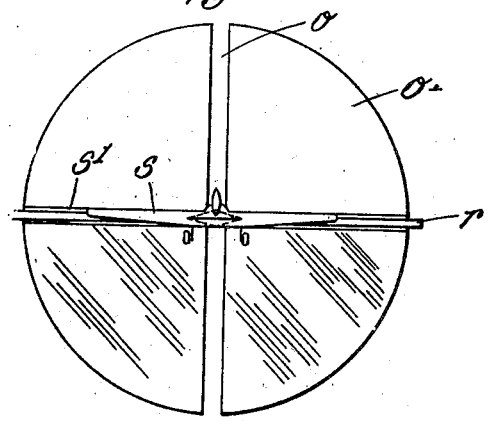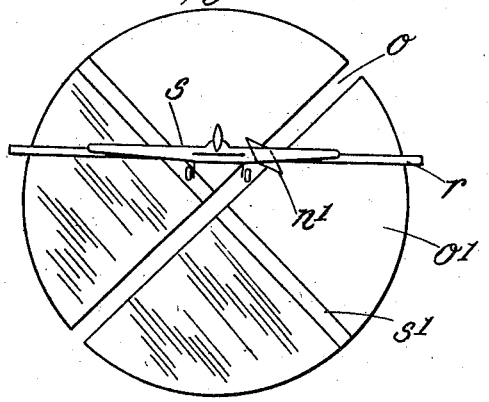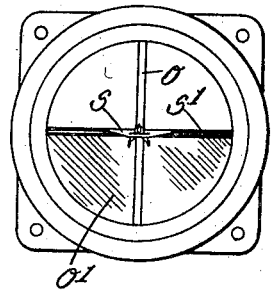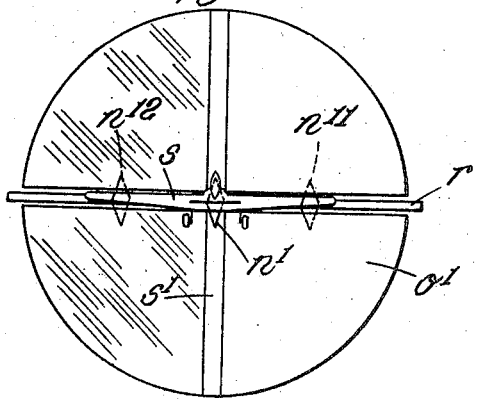
Douglas George King Moss
INVENTOR

Douglas George King Moss
INVENTOR

Sept. 6, 1938.    D. G. K. MOSS    2,128,956
GYROSCOPIC NAVIGATIONAL INSTRUMENT
Filed Jan. 16, 1937    4 Sheets-Sheet 4

Douglas George King Moss
INVENTOR
By
his ATTY.

Patented Sept. 6, 1938

2,128,956

UNITED STATES PATENT OFFICE 2,128,956

GYROSCOPIC NAVIGATIONAL INSTRUMENT

Douglas George King Moss, Sanderstead, England

Application January 16, 1937, Serial No. 120,907
In Great Britain April 8, 1936

9 Claims. (Cl. 33—204)

This invention relates to improvements in gyroscopic navigational instruments of the artificial horizon or gyro vertical type more particularly intended for use on aircraft, and watercraft (both surface and under-water craft).

The principal object of the invention is to provide novel indicating means for such instrument whereby the pilot may observe the trim of his craft pictorially. A further object of this invention is to provide novel indicating means for such instruments which will give an exaggerated movement of the data elements in order that even slight deviations from horizontal flight will be clearly indicated to the pilot.

According to this invention, the instrument is provided with a pivoted ghost ring, adapted to lie over and away from a front dial, which ring bears a pictorial representation of an aeroplane and is interconnected with an inner gimbal.

According to another form of this invention, a pictorial representation of the craft and a representation of the horizon are movable by the gimbals in opposite directions away from one another when the craft on which the instrument is mounted departs from the horizontal.

According to a further feature of the invention, a third indicator is provided and adapted to operate in conjunction with the indication given by the pictured aeroplane.

In order that this invention may be the more clearly understood and readily carried into effect, I will proceed to describe two embodiments of the same as applied to an air driven and controlled gyroscopic navigational instrument, with reference to the accompanying drawings, which are given by way of example only and not of limitation.

In these drawings:—

Figure 7:
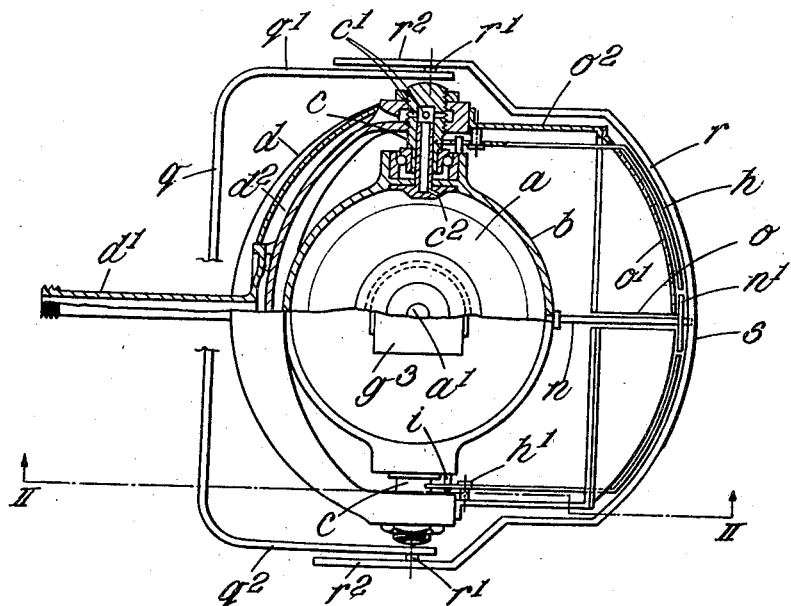
Figure 8:
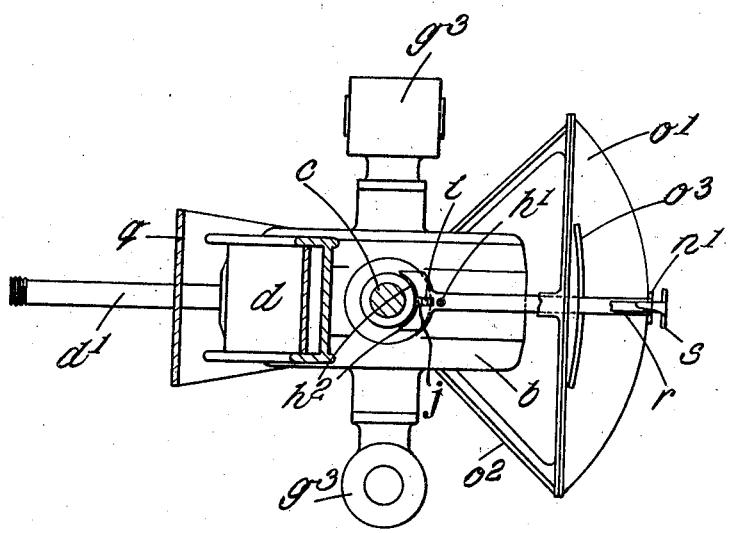
Figure 9:
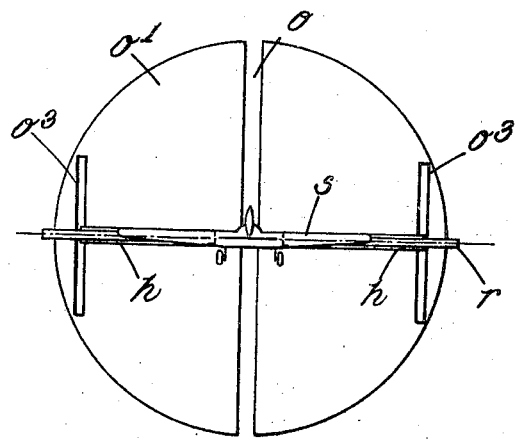
Figure 10:
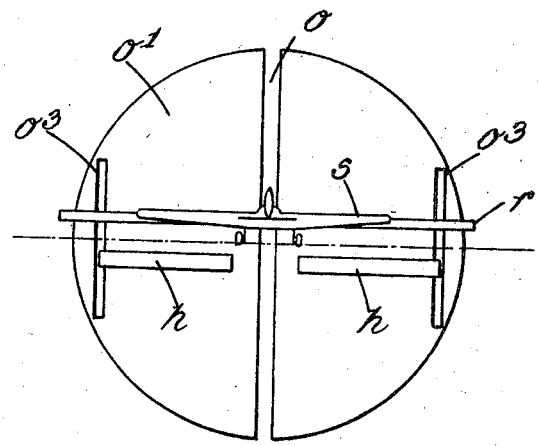

Figure 1 is a vertical section through a gyro vertical and indicator or "ghost" ring, Figure 2 is a part sectional plan of the same with the casing removed, Figure 3 is a front view of the indicator, without the casing, in normal position, Figure 4 is similar to Figure 3 but as seen when the craft is banking and climbing, Figure 5 is also similar to Figure 3, but as seen when the craft has banked 90°, Figure 6 is a front view of Figure 1, on a reduced scale, including the casing, Figure 7 is a part sectional plan, similar to Figure 2, showing another form of indicator, Figure 8 is a section of the line II—II of Figure 7 looking in the direction of the arrows, Figure 9 is a front view of the instrument shown in Figures 7 and 8, with the indicating means in normal position, and Figure 10 is similar to Figure 9, but showing the indicating means displaced as in climbing.

In the description which follows all like parts are referred to by like reference letters.

Referring to the drawings generally, an air-driven gyro wheel $a$ is rotatably mounted on a vertical spindle $a^1$ in an air-tight casing $b$, which constitutes an inner gimbal and which is rotatably mounted on inner gimbal trunnions $c$ carried by an outer semi-circular or U-shaped gimbal $d$ which in turn is rotatably mounted by means of a hollow spindle $d^1$ in spaced bearings $e$ forming an outer gimbal trunnion. This trunnion is housed in the back of the casing $f$. The axes of the trunnions intersect the vertical axis of the gyro wheel at the centre of the moving system.

By the use of only one trunnion bearing for the outer gimbal, the instrument case may revolve unhindered about the mechanism, whereby a complete roll or a series of rolls, if the instrument be mounted on an aircraft, may be executed without upsetting the instrument and the instrument will function when the aeroplane is steeply banked, for example, to 90° from normal and when it is inverted.

The gyroscope is controlled by rolling valves $g$, mounted on central pins $g^1$ which can roll in straight-line slots $g^2$ in the valve chamber $g^3$, motive air being drawn into the instrument and fed to the gyro-wheel and to the valve chambers $g^3$. Two valve chambers are provided and the rolling axes of the valves are arranged at right angles to one another. Each valve chamber is provided at each end with air-exit orifices $g^4$ arranged so that normally they are open to an equal extent. In order to reduce friction between the ends of the valve and the valve chamber, the ends of the pins $g^1$ are radiused and burnished and they are arranged to contact lightly with plugs $g^5$ which are inserted in the cheeks of the valve chamber so as to keep the ends of the valve clear of the cheeks. These plugs also serve to prevent escape of air through the slots $g^2$.

The air, which drives the gyro-wheel, is subsequently controlled by the valves so as to produce an erecting torque should the wheel spinning axis be displaced from vertical. Usually, a Venturi suction tube or other suitable means is attached to the tube $f^1$, and in flight air is drawn in through the hollow spindle $d^1$ at the inner end of which the air-stream divides and passes through a channel $d^2$ in each horn of the gimbal $d$ and then through inlet orifices in the inner gimbal bearings whence it passes through the trunnion and issues through an exit orifice as a jet which impinges on and drives the gyro wheel. As this construction of the horn of the gimbal $d$ and the trunnion is the same on each side of the gyro wheel it will suffice to identify the parts shown in section in Figures 2 and 7; in those figures $d^2$ is the air-channel, $c^1$ are the inlet orifices and $c^2$ is the exit orifice. The air-stream passes from the casing $b$ into the valve chambers $g^3$. When the gyro wheel axis deviates from the true vertical one or both of the valves will roll (depending upon whether the deviation is in a direction fore-and-aft or athwartships, or in both directions) thus uncovering a greater area of the exit orifices $g^4$ at one end of the valve chamber and covering a greater area of the exit orifices $g^4$ at the other end of the valve chamber, and thereby varying the intensity of the issuing air-jets and consequently producing the desired erecting torque. In the case of excessive deviation the exit orifices $g^4$ will be completely opened at one end and completely closed at the other end. The elements of the construction set forth in the foregoing have been shown and claimed in applicant's prior U. S. Patent 2,036,229.

Referring now to the present invention and particularly to Figures 1 to 6, on a bifurcated bracket $q$ secured to the casing $f$ with the limbs $q^1$, $q^2$ thereof embracing the instrument, there is pivotally mounted at $r^2$, on an axis parallel to or coincident with the inner gimbal axis when in normal position, a support $r$ which is hereinafter called a "ghost" ring. An arcuate dial $o^1$ with a vertical slot $o$ therein is mounted on a spider $o^2$ fixed to the outer gimbal $d$. The ghost ring $r$ is of U-channel section and is bent into substantially arcuate form to lie over and away from the arcuate dial $o^1$ of the instrument, it being pivoted to the bracket by solid elements lying in the channelling at the ends thereof. Suitably shaped weights $r^1$ are arranged on the solid elements on the opposite sides of the pivotal point to accurately balance the ghost ring $r$. On its outer surface the ghost ring bears a pictorial representation $s$ of a rear view of an aeroplane conveniently cut out from a piece of metal and suitably coloured and marked.

A rod $n$ is attached to the inner gimbal $b$ so as to extend at right angles to the gyro axis and also at right angles to the trunnion bearings $c$. This rod $n$ extends through the slot $o$ in the dial $o^1$ and at its end takes into the channelling of the ghost ring $r$ which thus normally lies in the plane of the trunnion $d^1$. When there is any deviation from the true level in the fore-and-aft direction, relative movement takes place between the dial $o^1$ and the rod $n$, the latter moves in the slot $o$. During any sideways displacement of the rod $n$ due to banking of the aeroplane, the end of the rod $n$ slides along in the channelling in the ghost ring $r$. Thus the device gives a qualitative reading as the wings of the pictured aeroplane will always be parallel to those of the craft on which the instrument is fitted. Normally the ghost ring $r$ will lie over the horizon line $s^1$ which is painted on the dial $o^1$ and roll and pitch may be noted by noting the position of the pictured aeroplane with respect to the horizon line $s^1$.

When, however, the aeroplane is steeply banked, the pictured aeroplane $s$ will lie over on its side and when the aeroplane is 90° out of normal will not indicate to the pilot the direction of flight upwardly or downwardly. To overcome this disadvantage there is provided on the rod $n$, at a point intermediate the dial $o^1$ and the ghost ring $r$, a diamond shaped piece $n^1$ conveniently coloured white and arranged with its major axis parallel to the ring $r$. During all normal operations the diamond $n^1$ is hidden behind the pictured aeroplane $s$ (as indicated by dotted lines in Figure 3), but when the craft is steeply banked the acute angle tips of the diamond $n^1$ will appear on either side of the ghost ring $r$ and will move away from the body of the pictured aeroplane to one side or the other according to the degree and direction of flight in an upward or downward direction. Thus, in Figure 4, which shows the parts in the position they would assume when the aeroplane is making a left-hand climbing banked turn, the tips of the diamond $n^1$ are seen on each side of the ghost ring $r$. In Figure 5 is shown the position the parts would assume when the aeroplane has banked 90°, the tip of the diamond $n^1$ behind the body of the pictured aeroplane showing that the plane is level fore and aft. If the diamond assumes a position as indicated by $n^{11}$ the plane is inclined nose-up, whilst if it assumes the position indicated by $n^{12}$ the plane would be inclined nose-down. By these means the pilot will be able to discern his true flight at all times in spite of the fact that the pictured aeroplane moves only in the one dimension.

Referring now to Figures 7 to 10, instead of the horizon line $s^1$ painted on the dial $o^1$, a representation of the horizon is given by the members $h$, hereinafter referred to as the "horizon" ring, which extend through slots $o^3$ in the dial $o^1$. In the form shown the horizon ring $h$ is pivoted at $h^1$ to the outer gimbal $d$ and is balanced by the counterpoise weights $h^2$. A pin $i$ on the inner gimbal acts in the slot $j$ in the bifurcated ends of the horizon ring. The horizon ring $h$ normally lies in the horizontal plane and behind the ghost ring $r$, above and below which the edges of the horizon ring $h$ may be seen (Figure 9). If the craft on which the instrument is mounted commences to climb, the axis of the spindle $d^1$ of the outer gimbal $d$, as seen in Figure 8, is tilted causing a rotation of the outer gimbal about the inner gimbal and the axis $c$ in a clockwise direction and the rod $n$ will hold the ghost ring $r$ substantially stationary while the dial $o^1$ moves in a downward direction—to give an apparent upward movement of the aeroplane. The movement of the outer gimbal would cause the pivots $h^1$ to move downwards, thus causing the pins $i$ to rock the members $h$ about the pivots $h^1$ so that the horizon ring would move downwardly with respect to the dial $o^1$ and away from the pictured aeroplane $s$, as may be seen from Figure 10. The pivots $h^1$ and the pins $i$ could be transposed, that is, the pins $i$ could be on the outer gimbal and the pivots $h^1$ on the inner gimbal, and the same result be obtained.

The diamond $n^1$ acts exactly as described with reference to Figures 3 to 5.

The indicating means may be employed with other similarly acting erecting means or other instruments having the same characteristics, for example, an electrically driven instrument.

I claim:

1. In a gyroscopic navigational instrument, a semi-circular outer gimbal supported at the rear by a single trunnion for movement about a fore and aft axis, an inner gimbal pivoted to said outer gimbal on a transverse axis, a gyro wheel having a normal vertical spin axis carried by said inner gimbal, a dial carried by said outer gimbal at the front of the instrument, said dial having a vertical slot, a member pivoted on an axis normally coincident with said transverse axis and extending across in front of said dial, a pictorial representation of an aeroplane mounted on said member over said dial, and means extending through said slot for slidably connecting said member with said inner gimbal whereby the latter is stabilized against pitching movements.

2. In a gyroscopic navigational instrument, an outer gimbal supported at the rear by a single trunnion for movement about a fore and aft axis, an inner gimbal pivoted to said outer gimbal on a transverse axis, a gyro wheel having a normal vertical spin axis carried by said inner gimbal, a dial carried by said outer gimbal at the front of the instrument, said dial having a vertical slot, a member of U-section pivoted on an axis normally coincident with said transverse axis and extending across in front of said dial so as to provide a transverse guide channel open towards the latter, a pictorial representation of an aeroplane carried by said member over said dial, and a rod attached to said inner gimbal extending through said slot and normally lying coincident with the axis of said single trunnion, the free end of which rod lies in the channel in said pivoted member so as to stabilize the latter against pitching movements.

3. In a gyroscopic navigational instrument, an outer gimbal supported at the rear by a single trunnion for movement about a fore and aft axis, an inner gimbal pivoted to said outer gimbal on a transverse axis, a gyro wheel having a normal vertical spin axis carried by said inner gimbal, a dial carried by said outer gimbal at the front of the instrument, said dial having a vertical slot, a member pivoted on an axis normally coincident with said transverse axis and extending across in front of said dial, a pictorial representation of an aeroplane mounted on said member over said dial, means extending through said slot for slidably connecting said member with said inner gimbal whereby the latter is stabilized against pitching movements, pivoted elements representing the horizon also extending across in front of said dial and normally behind said pivoted member, and means controlled by said gyro wheel for moving said elements in the same direction as said dial but to an exaggerated extent when relative movements take place between the gimbals.

4. In a gyroscopic navigational instrument, an outer gimbal supported at the rear by a single trunnion for movement about a fore and aft axis, an inner gimbal pivoted to said outer gimbal on a transverse axis, a gyro wheel having a normal vertical spin axis carried by said inner gimbal, a dial carried by said outer gimbal at the front of the instrument, said dial having a vertical slot, a member of U-section pivoted on an axis normally coincident with said transverse axis and extending across in front of said dial so as to provide a transverse guide channel open towards the latter, a pictorial representation of an aeroplane carried by said member over said dial, a rod attached to said inner gimbal extending through said slot and normally lying coincident with the axis of said single trunnion, the free end of which rod lies in the channel in said pivoted member to stabilize the latter against pitching movements, a representation of the horizon comprising pivoted elements extending through slots in and lying across in front of said dial, and means controlled by said gyro wheel for moving said elements in opposite directions on relative movement of said inner and outer gimbals.

5. In a gyroscopic navigational instrument, an outer gimbal supported at the rear by a single trunnion for movement about a fore and aft axis, an inner gimbal pivoted to said outer gimbal on a transverse axis, a gyro wheel having a normal vertical spin axis carried by said inner gimbal, a dial carried by said outer gimbal at the front of the instrument, said dial having a vertical slot, a member of U-section pivoted on an axis normally coincident with said transverse axis and extending across in front of said dial so as to provide a transverse guide channel open towards the latter, a pictorial representation of an aeroplane carried by said member over said dial, a rod attached to said inner gimbal extending through said slot and normally lying coincident with the axis of said single trunnion, the free end of which rod lies in the channel in said pivoted member to stabilize the latter against pitching movements, a diamond shaped element mounted on said rod between said dial and said pivoted member and normally hidden behind the pictured aeroplane, a representation of the horizon normally behind said pivoted member comprising pivoted elements extending through slots in and lying across in front of said dial, and means controlled by said gyro wheel for moving said elements on relative movement of said inner and outer gimbals.

6. In a gyroscopic navigational instrument, a semi-circular outer gimbal supported at the rear by a single trunnion for movement about a fore and aft axis, an inner gimbal pivoted to said outer gimbal on a transverse axis, a gyro wheel having a normal vertical spin axis carried by said inner gimbal, a dial carried by said outer gimbal at the front of the instrument, said dial having a vertical slot, a member pivoted on an axis normally coincident with said transverse axis and extending across in front of said dial, a pictorial representation of an aeroplane mounted on said member over said dial, means extending through said slot for slidably connecting said member with said inner gimbal whereby the latter is stabilized against pitching movements, and an indicator carried by said connecting means and visible behind the representation of the aeroplane when the craft carrying the instrument is steeply banked.

7. In a gyroscopic navigational instrument, an outer gimbal supported at the rear by a single trunnion for movement about a fore and aft axis, an inner gimbal pivoted to said outer gimbal on a transverse axis, a gyro wheel having a normal vertical spin axis carried by said inner gimbal, a dial carried by said outer gimbal at the front of the instrument, said dial having a vertical slot, a member of U-section pivoted on an axis normally coincident with said transverse axis and extending across in front of said dial, a pictorial representation of an aeroplane carried by said member over said dial, a rod attached to said inner gimbal extending through said slot and normally lying coincident with the axis of said single trunnion, the free end of which rod lies in the channel in said pivoted member so as to stabilize the latter against pitching movements, and an indicator mounted on said rod intermediate said dial and said member and visible behind the representation of the aeroplane when the craft carrying the instrument is steeply banked.

8. In a gyroscopic navigational instrument, an outer gimbal supported at the rear by a single trunnion for movement about a fore and aft axis, an inner gimbal pivoted to said outer gimbal on a transverse axis, a gyro wheel having a normal vertical spin axis carried by said inner gimbal, a dial carried by said outer gimbal at the front of the instrument, said dial having a vertical slot, a member pivoted on an axis normally coincident with said transverse axis and extending across in front of said dial, a pictorial representation of an aeroplane mounted on said member over said dial, means extending through said slot for slidably connecting said member with said inner gimbal whereby the latter is stabilized against pitching movements, pivoted elements representing the horizon also extending across in front of said dial and normally behind said pivoted member, means controlled by said gyro wheel for moving said elements on relative movement of said inner and outer gimbals, and an indicator mounted on said rod intermediate said dial and said member and visible behind the representation of the aeroplane when the craft carrying the instrument is steeply banked.

9. In a gyroscopic navigational instrument, an outer gimbal pivoted about a fore and aft axis, an inner gimbal pivoted to said outer gimbal about a transverse axis, a gyro wheel having a normally vertical spin axis carried by said inner gimbal, a member pivoted about an axis normally coincident with said transverse axis, a pictorial representation of an aeroplane mounted on said member, means connecting said member with the inner gimbal so as to stabilize said member against pitching movements, an element arranged near the representation of the aeroplane to represent the horizon and pivoted on one of said gimbals about an axis parallel to said transverse axis, and connected to the other gimbal so as to be displaced by relative movements between the gimbals in the direction of the outer gimbal to a greater extent than the latter, said pictorial representation of the aeroplane and said representation of the horizon both being movable in opposite directions relative to one another.

DOUGLAS GEORGE KING MOSS.